Dec. 27, 1932.  E. E. KELLEY  1,892,239
MACHINE TOOL
Filed July 7, 1930   7 Sheets-Sheet 1

INVENTOR,
Elmer E. Kelley
BY
Walter C. Roos
ATTORNEY.

Dec. 27, 1932.  E. E. KELLEY  1,892,239
MACHINE TOOL
Filed July 7, 1930  7 Sheets-Sheet 4
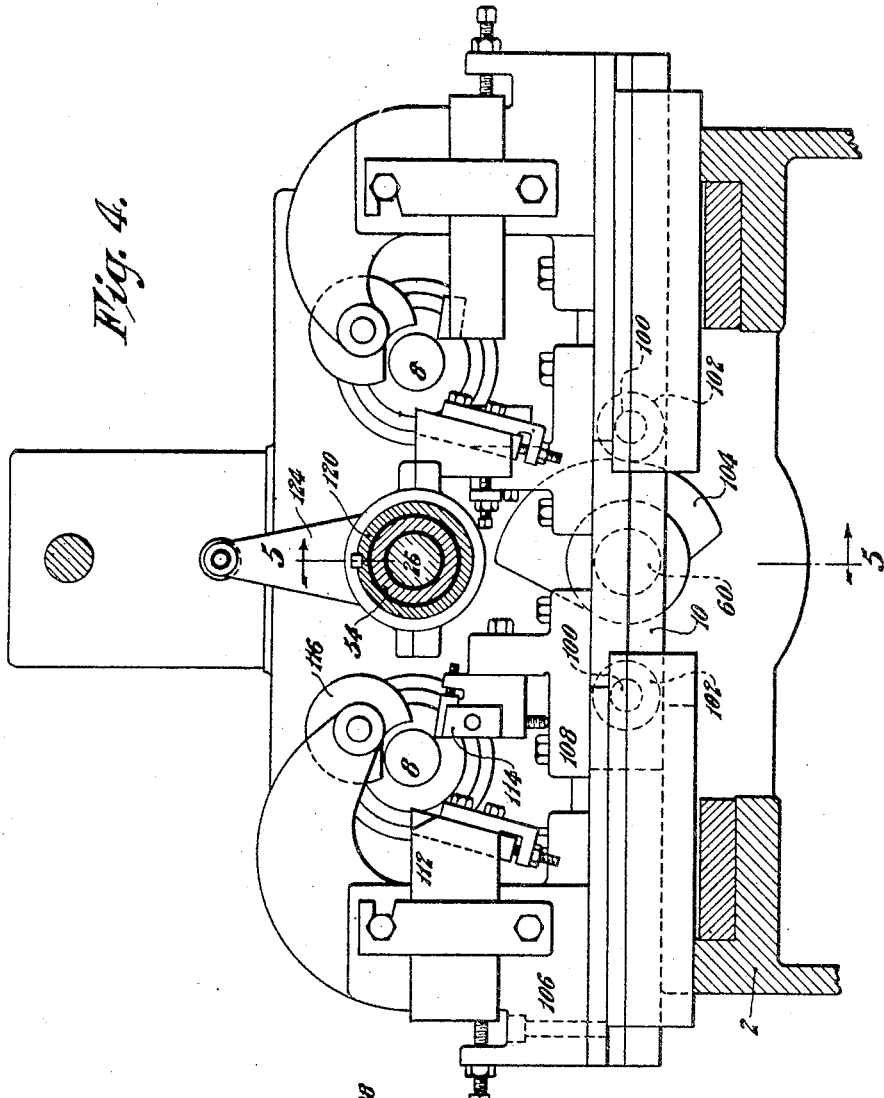
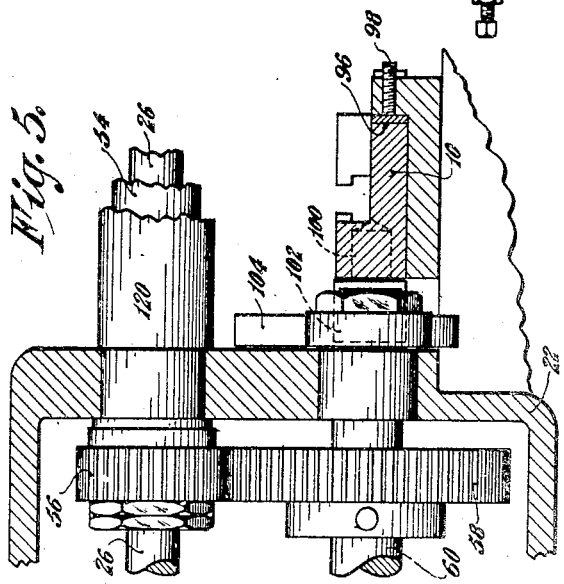

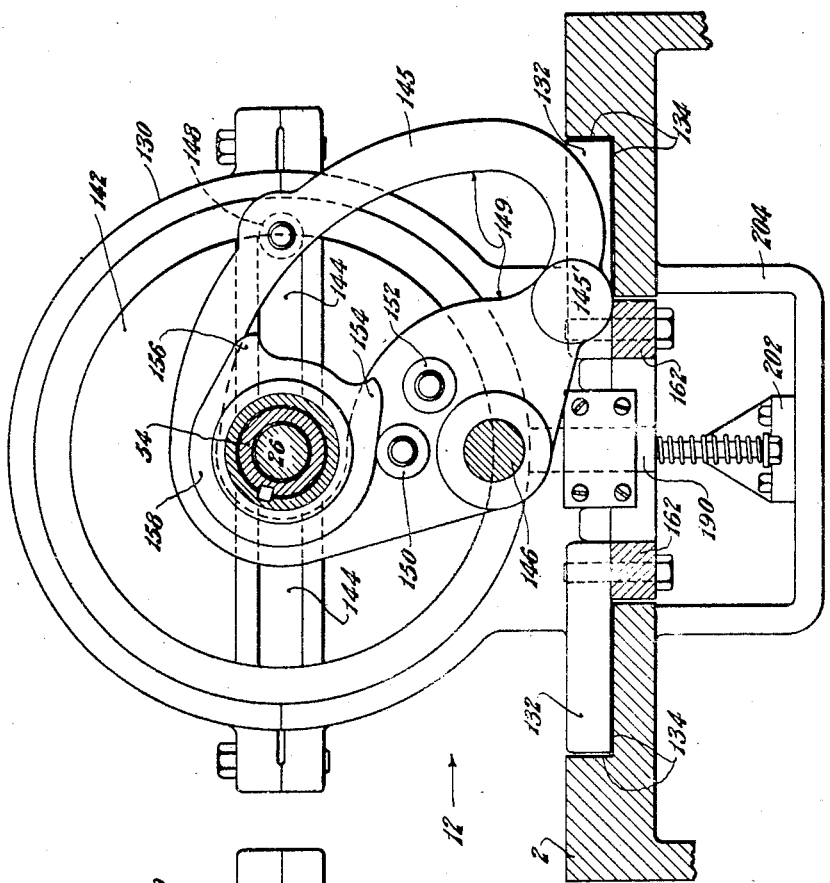
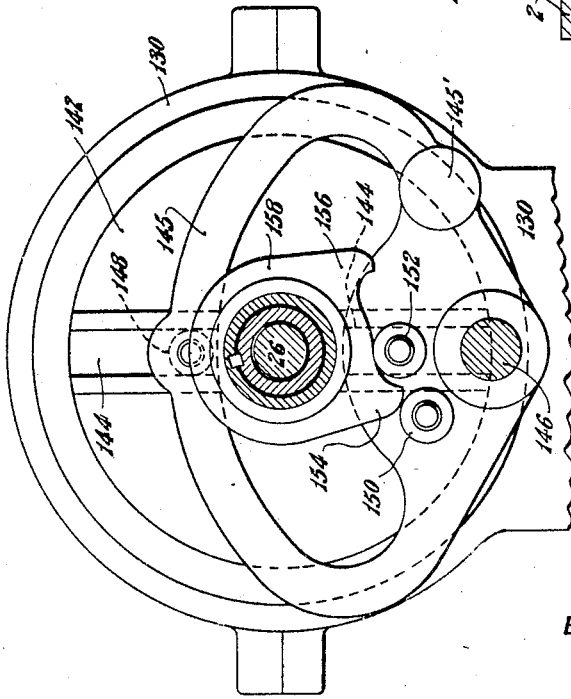

Dec. 27, 1932.   E. E. KELLEY   1,892,239
MACHINE TOOL
Filed July 7, 1930   7 Sheets-Sheet 6

INVENTOR.
Elmer E Kelley
BY Walter C. Ron
ATTORNEY.

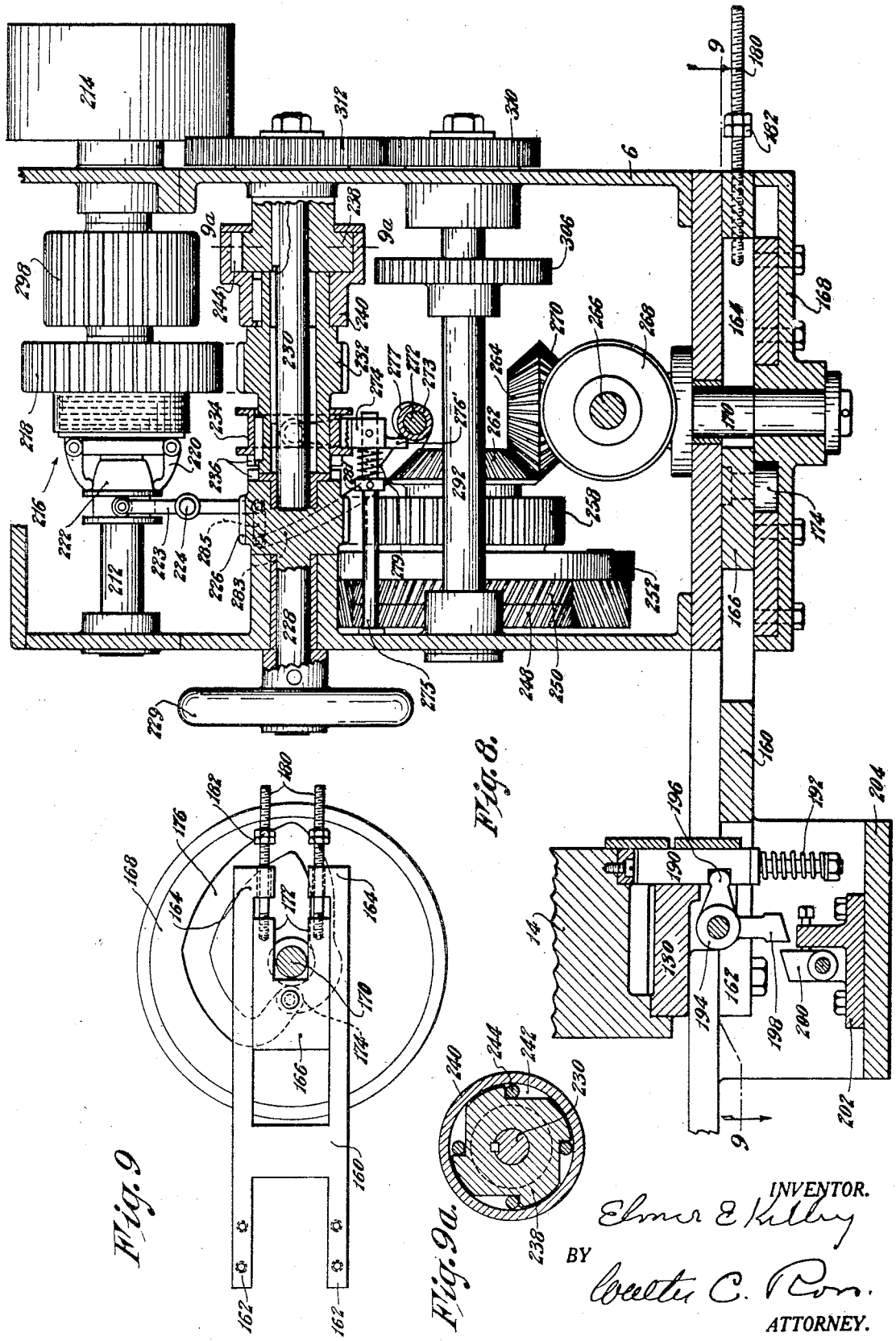

Patented Dec. 27, 1932

1,892,239

UNITED STATES PATENT OFFICE

ELMER E. KELLEY, OF WINDSOR, VERMONT

MACHINE TOOL

Application filed July 7, 1930. Serial No. 466,149.

This invention relates to improvements in machine tools and is directed more particularly to machines known as automatic screw machines and the like.

The principal objects of the invention are the provision of a machine of the class described which includes a plurality of spindles, a tool slide movable transversely with respect thereto, a turret rotatable on horizontal axis which is movable towards and away from the spindles and means for operating the parts in proper timed relation.

Among other numerous novel objects and advantages of the invention to be more fully hereinafter set forth the machine is not only simple and rugged in its construction but is adapted for efficient operation and capable of precision work.

The invention in the form at present preferred will be described in connection with the accompanying drawings, but it will be understood that changes may be made in the form thereof without departing from the spirit and scope of the invention.

In the drawings:

Fig. 4 is a transverse sectional view taken on the line 4—4 of Fig. 1.

Fig. 5 is a partial vertical sectional view taken on the line 5—5 of Fig. 4.

Fig. 6 is a transverse sectional view taken on the line 6—6 of Fig. 1, and

Fig. 6a is a similar view with the parts shown in a different relation.

Fig. 8 is a longitudinal sectional view taken on the line 8—8 of Fig. 7.

Fig. 9 is a plan view at small scale taken on the line 9—9 of Fig. 8, and

Fig. 9a is a sectional elevational view on the line 9a—9a of Fig. 8.

Figure 1:
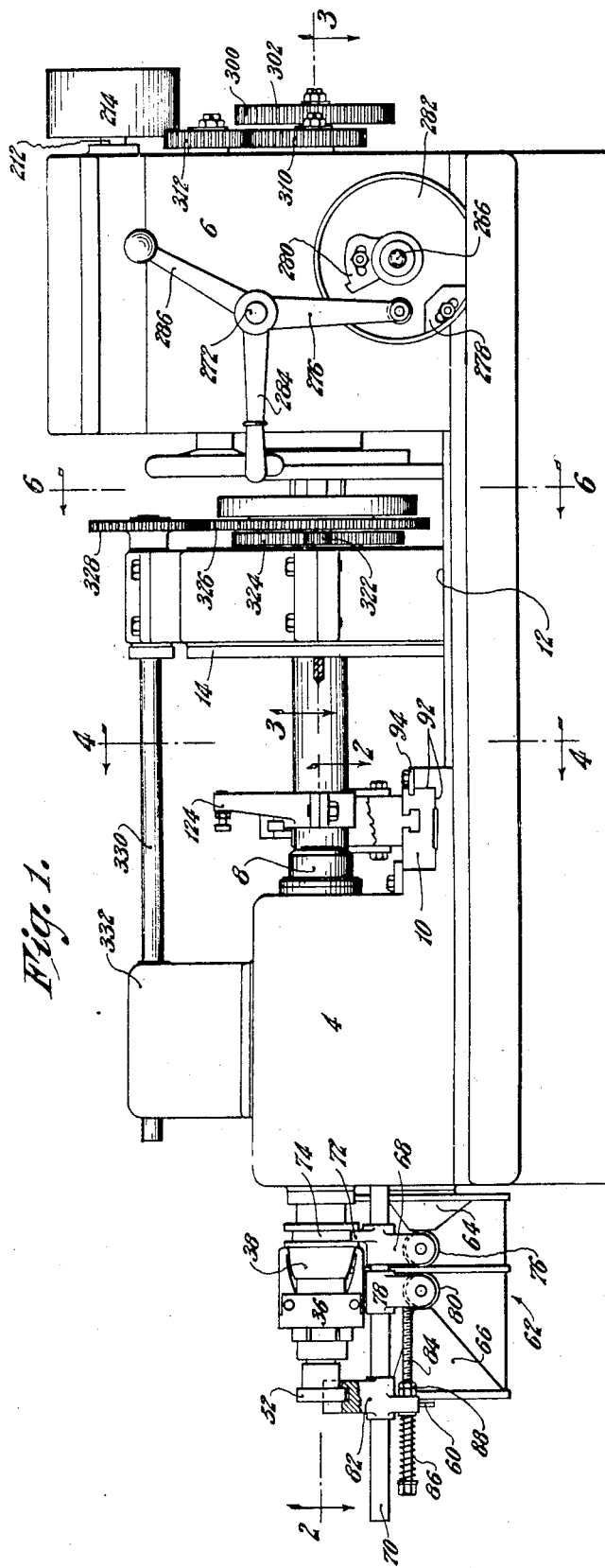
Fig. 1 is a side elevational view of a machine embodying the novel features of the invention.
Figure 2:
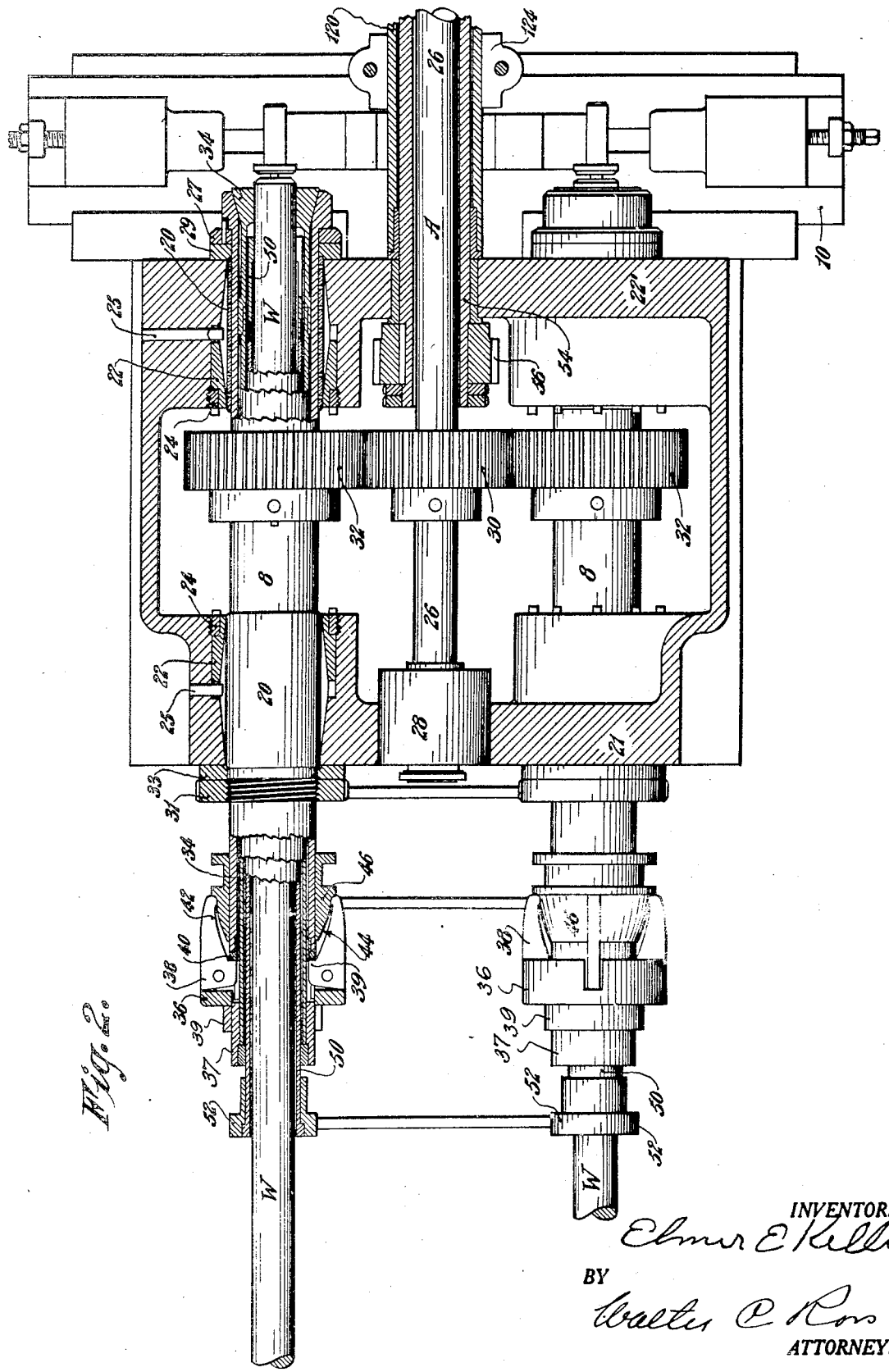
Fig. 2 is a sectional plan view at a larger scale through the headstock taken on the line 2—2 of Fig. 1.
Figure 3:
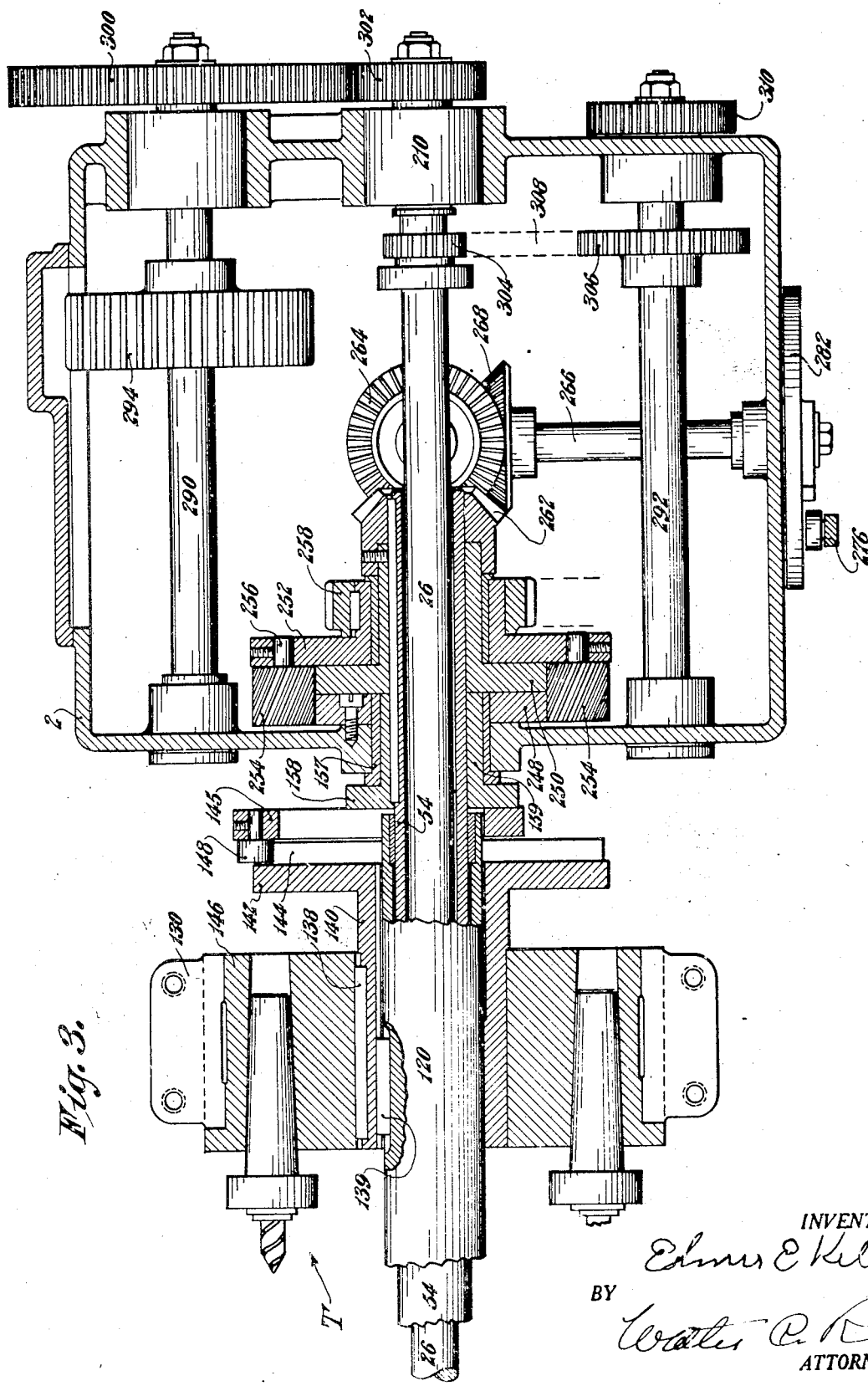
Fig. 3 is a sectional plan view taken on the line 3—3 of Fig. 1.
Figure 7:
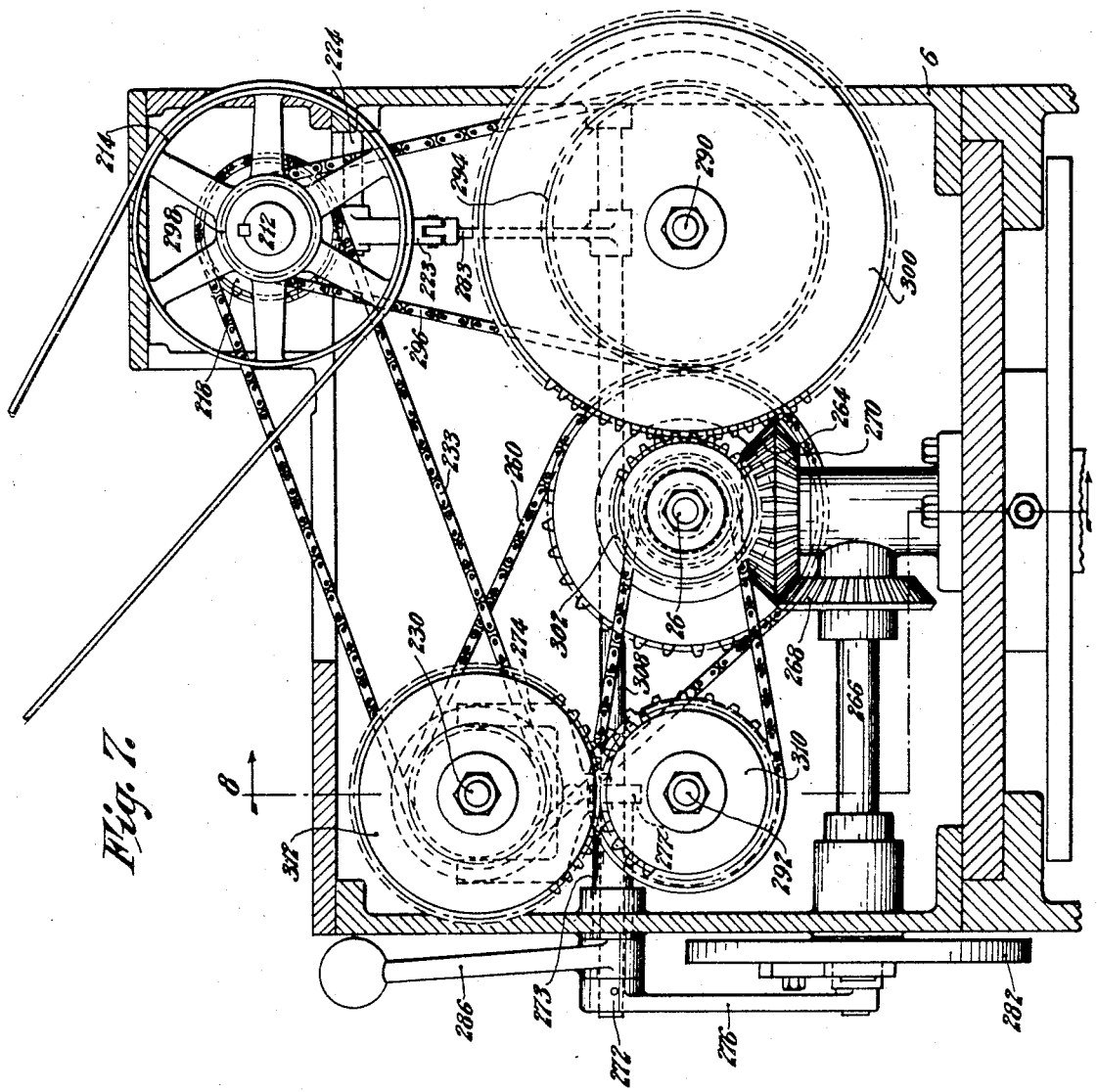
Fig. 7 is a rear elevational view of the rear end of the machine with parts in section.

Referring now to the drawings the machine will first be described in a general way after which it will be described more in detail.

With reference to Fig. 1, a bed is shown at 2 which supports a headstock 4 at one end and a gear box 6 at the opposite end. A pair of spindles 8 are rotatably supported by the headstock while a tool slide 10 is provided which moves transversely of the machine to feed tools transversely of work carried by the spindles. A slide 12 is slidable longitudinally of the machine and carries a tool turret 14 which is indexed for bringing a tool or tools into position so that they may as the slide moves forward and back engage and disengage work carried by the spindles.

The construction of the headstock 2 will now be described in detail.

The spindles 8 are hollow and are rotatable in bearings 20 which are adjustable in forward and rear walls 21 and 22 of the headstock. These bearings are externally tapered from opposite ends and are split longitudinally from their ends for part of their length so as to be more or less yieldable.

Rings 22 which have inner tapering surfaces for fitting over bushings 20 are held in place and moved inwardly for acting on the bushings 20 by rings 24 screw threaded in the walls 21 and 22' of the housing. By screwing the rings 24 inwardly the bushings are contracted to take up wear between the bushings and spindles 8. Pins 25 engage with longitudinal slots in the bushings hold them against rotation.

A central shaft or spindle 26 having its end journalled by a roller bearing 28 in the wall 21 has a gear 30 fixed thereto which meshes with gears 32 fixed to the spindles 8. This shaft 26 extends longitudinally and is journalled at its other end in the gear box. It is driven continuously as will later appear and functions to rotate the spindle 8.

A collar 27 rotates with the spindle and bears against a collar 29 at one end of the headstock while a collar 31 screw threaded on the spindle bears against a collar 33 at the opposite end of the headstock. In this way the spindle may rotate freely and is held against axial movement.

The spindle assemblies are similar in construction so that but one will be described in detail. A hollow collet 34 which as usual is provided with a split forward end is freely slidable in the spindle 8. A collar 36 adjacent the rear end of the spindle is provided with levers 38 pivoted thereto. The collar 36 is carried by a tubular member 37 which is secured to the outer end of collet 34 and its rear side is arranged to abut a part 39 fixed to member 37. The member 37 may be secured to the collet in any suitable manner as by screw thread, welding or the like. The inner ends 39 of the levers are arranged to bear on a wear surface 40 at the end of the spindle while the outer ends 42 thereof are arranged to be acted upon by the curved surface 44 of a cam or cone 46 which is slidable on the spindle. As the cone 46 moves rearwardly the levers are swung outwardly and their inner ends abut the end of the spindle so that the collet is moved rearwardly whereby its split forward end is contracted for firmly embracing a bar of work W. As the spindle rotates it will rotate the bar clamped thereby.

A feed tube 50 is slidable in the collet 34 and has a split forward end which is resilient for yieldingly embracing the work. A collar 52 is fixed to the rear end of the tube which is engageable by means to be described for moving the feed tube back and forth. While the collet clamps the work the feed tube may be moved to the rear. When the collet releases the work the feed tube will yieldingly grip the work so that the work may be moved forwardly thereby. In this way work is fed inwardly or forwardly of the spindle by the feed tube.

A tube 54 is journalled at its end in wall 22' and surrounds shaft 26. It is journalled and out of contact with shaft 26 and has a gear 56 fixed thereto which meshes with a gear 58 of a shaft 60 journalled in the walls 21 and 22. This shaft 60 has a cam drum 62 on its outer end which is provided with cam pads 64 and 66. A follower 68 slidable on a guide rod 70 has a projection 72 running in a groove 74 of cone 38 and a roll 76 which may be engaged by cam pad 64. Another follower 78 slidable on said guide rod has a roll 80 for engaging pad 66. A fork member 82 engaging collar 52 is also slidable on the guide rod. A threaded rod member 84 extends from the follower 78 and slides through fork member 82. A spring 86 between the outer end of rod 84 and fork 82 is provided so that the fork will be yieldingly urged to the right while nuts 88 on the rod are for abutting an opposite side of the fork member.

As the cam member rotates it will move members 68 and 78 so that in proper timed relation the collet will release the work while the feed tube moves forward and back to feed the work forwardly of the collet.

The tube 54 at its end remote from the headstock is rotatable in the gear box 6. It is driven by suitable means in the gear box at what may be called high and low speeds so that the collets are clutched to the spindles and feed tubes are operated for rotating work and for feeding the work at the proper time. The rod and nut construction between fork 82 and member 78 permit the parts to be adjusted to obtain efficiency in operation.

The tool slide just forwardly of the head stock is slidable transversely in ways 92 and is held for sliding movements therein by gibs 94. Suitable means such as a wear plate 96 and adjusting screw 98 are provided to facilitate the taking up of wear.

Studs 100 at the side of the slide adjacent the head stock have rolls 102 rotatable thereon which are engaged by the peripherial cam surface of a cam 104 fixed to the inner end of shaft 60. As the shaft rotates first one and then the other of the rolls are engaged by the cam so that the slide is moved back and forth transversely. Supports 106 and 108 for tools 112, 114 and 116 are adjustable in the slide. These tools may take any form desired depending upon the work to be done on the bars carried by the spindles. Preferably however the tools will be arranged so that a certain operation is being performed on the bar of one spindle while another operation is being performed on the bar of the other. As a special feature, the tools 116 will comprise a circular cut off tool. As the slide moves in one direction the tool 116 at one side of the slide may be arranged to cut off from the bar of one spindle a previously formed piece of work, while some tool at the other end of the slide is performing a forming operation on the end of the bar of the other spindle. It will be possible to arrange tools so that the bars of both spindles are being acted upon practically the entire cycle of operation of the slide so that the utmost efficiency in operation may be obtained.

A turret tube 120 surrounds tube 54 and is preferably out of contact therewith except where it is journalled for rotation thereon at opposite ends adjacent the gear box and headstock. This tube 120 is operated intermittently or is rotated and indexed for indexing a stop arm 124 fixed thereto adjacent the headstock so that the arm may be positioned in front of one spindle and then the other and against which the inner end of a bar of work may abut when fed forwardly by a feed tube in a spindle.

The turret slide assembly 12 will now be described in detail with particular reference to Figs. 3, 6, 6a, 8 and 9.

A support or housing 130 has foot portions 132 which are slidable in suitable ways 134 disposed longitudinally of the bed 2. This has rotatable therein the turret 14. The turret 14 is keyed as at 138 to a hub 140 of a disc 142. The hub 140 of the disc is slidable along the turret tube 120 and is held against relative rotation by a key and spline construction 139 as shown. Of course any other suitable means may be employed. As the turret slide moves back and forth as it does along the bed the turret and disc move therewith while the tube 120, turret 14 and disc are rotated one with the other. The disc 142 is provided with a slot 144 across the face thereof.

A rocking indexing arm 145 is pivoted at its lower side to the gear box as at 146 below the shaft 26 for swinging movements and has a roll 148 on its side adjacent the disc 142. A slot 149 in the arm is disposed so that the arm clears the tube 120 for its swinging movements. Rolls 150 and 152 on the face of the arm 145 are engageable by the points 154 and 156 of a cam 158 fixed to and rotatable with tube 54.

As tube 54 rotates clockwise with the parts in the position shown in Fig. 6 the nose 154 of cam 158 engages roll 150 and swings arm 145 to the left. As the arm 145 swings to the left the roll 148 traverses slot 144 to rotate disc 142 counter-clockwise and with it tube 120, turret 14 and stop arm 124. The parts are so arranged that said rotative movements bring the stop arm 124 into position in front of one spindle, and moves tools carried by the turret into desired positions. The arm 145 is moved by nose 154 of the cam sufficiently to move the disc 142 through an angle of 190 degrees when arm and disc come to rest as the nose 154 leaves roll 150. Then roll 152 is engaged by nose 156 of the cam. During the rest period the stop arm is in front of one spindle and a bar of work may be fed thereagainst. As cam 158 continues to rotate, the nose 156 thereof acting on roll 152 swings arm 145 further to the left and rotates the disc, turret and stop arm counter-clockwise through 90 degrees. This movement carries the stop arm 124 out of a stop position and from in front of a spindle.

The indexing movements of the turret positions tools carried thereby so that in forward movements thereof the tools may act on work carried by one spindle and then on work carried by the other while the stop is indexed to a position in front of one spindle and then the other.

After each indexing movement the turret slide is moved forwardly towards the spindles and then back. As the slide moves forwardly and carries the disc 142 with it, the slot 144 thereof and roll 148 are disengaged whereby the arm 145 swings to position at the right as in Fig. 6. In this way roll 148 will be positioned for entering slot 144 of disc for another indexing movement as the slide moves rearwardly and away from the spindles. This may be accomplished by a weight 145' on arm 145 or a tension spring or other suitable means may be employed.

The turret slide 130 is moved towards and away from the spindles by means of the following:

A slide 160 is fixed at its forward ends 162 to the turret slide 130 and is provided with arms 164 between which is slidable a block 166. The slide is supported between a cam 168 and the lower side of the gear box 6. The cam 168 is fixed to a shaft 170 rotatable in the lower side of the gear box which is operated as will later appear.

The block 166 is provided with a slot 172 so as to clear shaft 170 and has a roll 174 on the under side which runs in a groove 176 of the cam 168. As the cam rotates the block is moved back and forth. The slide 160 is operated by the block 166 and while the block makes a stroke of certain length the slide may make a stroke of different length. To accomplish this a threaded bolt or bolts such as 180 fixed on the block 166 pass loosely through suitable openings in the end of slide arms 164 and nuts 182 adjustable along the bolts are arranged to abut slide arms 164. As the block moves to the left the nuts bring up against the slide to move it to the left. As the block 166 moves to the right the end of the block abuts the end of the slide so as to move it to the right.

Not only may the amount of travel of the slide be varied but lost motion between the block and slide may be taken advantage of for allowing the slide and turret to dwell at one end or the other of its stroke. This will be desirable in many instances.

The turret 14 is locked to the turret slide 130 while the slide moves forward and back while it is released when in its rearward position so as to allow the indexing mechanism to operate. This is accomplished by means of the following (see Fig. 8): A lock bolt 190 is slidable in the turret housing and is spring pressed upwardly by a spring 192. A lever 194 pivoted to the housing has an arm 196 in a suitable slot of the bolt and a depending arm 198. A dog 200 pivoted to a bracket 202 fixed to a cross strip 204 of the bed is arranged so that its upper end is disposed in the path of lever arm 198. The upper end of the bolt 190 is receivable in suitably arranged openings in the turret and as the turret slide nears the end of its rearward stroke the lever arm 198 strikes the dog whereby the bolt is pulled downwardly to release the turret for indexing. As the turret is rotated so that it is indexed the bolt 190, acting under the influence of the spring, enters another opening in the turret so as to lock it against rotation. As the turret is moved towards the spindles the lever arm 198 passes over dog 200 which may move to allow of this.

The driving mechanism associated with the gear box 6 will now be described in detail with particular reference to Figs. 1, 3, 7, 8, 9 and 9a.

The shaft 26 which has been referred to extends through the gear box 6 and is journalled therein by means of a roller bearing 210. The tube 54 previously described is keyed to cam 158, the hub 159 of which cam is rotatable in a bushing 157 in the gear box. The end of tube extends into the gear box.

A main driving shaft 212 is disposed parallel to shaft 26 and is journalled for rotation in the gear box 2. This may be provided with a driving pulley 214 so that it may be connected by a belt to a source of power or it may be otherwise connected to some suitable source of power.

Clutch mechanism indicated generally by 216 is carried by shaft 212 and a chain sprocket 218 associated with the clutch is clutched to the shaft or free to rotate thereon accordingly as the clutch is engaged or disengaged. The clutch may comprise friction discs of ordinary form and is provided with arms 220 which when swung by a cone collar 222 slidable on the shaft will cause the chain sprocket 218 to be clutched to the shaft so that the sprocket acts as a driver. The collar is shiftable by a fork 223 oscillatable on a rod 224 fixed in the rear wall of the gear box.

The mechanism now being described is part of what may be called a high speed drive.

A chain sprocket 226 has a shaft portion 228 rotatable in the wall of the gear box which carries a hand wheel 229 and rotatably receives in its inner end the end of a shaft 230 rotatable in an opposite wall of the housing. A second chain sprocket 232 is rotatable on shaft 230 and has a clutch collar 234 non-rotatable but slidable thereon. Engageable teeth 236 are provided on adjacent faces of sprocket 226 and collar 234. A chain 233 connects sprockets 218 and 232. A clutch hub 238 is keyed to shaft 230 and a clutch ring or shell 240 is keyed to sprocket 232 and surrounds the hub. Notches or recesses are provided in the hub which have clutch rolls or pins 244 movable therein. As shaft 212 rotates counter-clockwise with clutch teeth of sprocket 236 and collar 234 engaging, the sprocket 226 is driven from shaft 212 at high speed.

As will be later described shaft 230 may be driven at slow speed while sprocket 232 is driven at a faster speed because the ring 240 may rotate freely about hub 238. A gear 248 having a certain number of teeth is fixed to the wall of the gear box and a gear 250 having a different number of teeth is keyed to tube 54. A spider 252 is rotatable on hub of gear 250 and has pinions 254 rotatable on pins 256 carried thereby which mesh with gears 248 and 250. A sprocket 258 fixed to said spider is connected by a chain 260 to sprocket 226.

As sprocket 258 is rotated by sprocket 226 the spider 252 is rotated so that the pinions carried thereby and meshing with stationary gear 248 impart a rotary motion to gear 250. In this way tube 54, turret 14 and stop arm 124 fixed thereto are rotated for the indexing operation.

A bevel gear 262 fixed to the end of tube 54 meshes with a gear 264 of shaft 170 which has already been referred to so that the turret slide cam 168 is rotated.

A shaft 266 is journalled in the gear box and has a gear 268 fixed thereto which meshes with gear teeth 270 on the under side of gear 264 whereby it is rotated. A relatively rotatable rock shaft 272 and cam tube 273 are rotatable in the gear box above shaft 266. A shifting fork 274 operatively engaging collar 234 is slidable on a rod 275 fixed to the gear box and has a depending portion 275' which is engageable by a cam 277 at the inner end of tube 273. A spring 279 on said rod 275 between a collar 281 fixed thereto and said fork 274 is provided to urge said fork to the right to disengage clutch teeth 236. A weighted lever 286 fixed to the outer end of cam tube is provided which may be swung between right and left positions for oscillating tube 273 and causing cam 277 to move fork 274 back and forth and thereby engage or disengage clutch teeth 236. Accordingly as these clutch teeth are disengaged or engaged the sprocket will be driven from collar 234 which may be driven at either high or low speed.

A lever 276 is fixed to shaft 272 and its lower end arranged to be engaged by cam patches 278 and 280 which are adjustable on a cam 282 fixed to shaft 266. An arm 283 fixed to rock shaft 272 is connected by a link 285 to fork member 223 so that as shaft 272 is oscillated by means of cam 282 acting on lever 276 the clutch mechanism 216 is engaged or disengaged. A hand grip 284 extending from lever 276 facilitates the rocking of shaft 272 and the manual engaging or disengaging of the clutch mechanism 216 referred to.

The parts constituting the slow speed driving apparatus will now be described.

A shaft 290 is rotatable in the gear box below drive shaft 212 and at the right of shaft 26 and tube 54 and a shaft 292 is rotatable in the box below shaft 230 and at the left side of shaft 26. Shaft 290 has fixed thereto a chain sprocket 294 and a chain 296 connects this sprocket with a sprocket 298 on drive shaft 212. In this way the lower shaft 290 is driven from the pulley shaft. Intermeshing gears 300 and 302 fixed to shafts 290 and 26 connect the shafts so that the latter is continuously rotated from the drive shaft.

A chain sprocket 304 on shaft 26 and a similar sprocket 306 on shaft 292 are connected by a chain and intermeshing gears 310 and 312 are fixed to shafts 292 and 230 whereby shaft 230 is continuously driven from shaft 26.

By reason of the ratio of the gears and sprockets shaft 230 is rotated continuously at a comparatively slow speed. That is, shaft 212, the driving shaft, which operates at a high speed imparts, by means of the chains and gears, a slower speed to the shaft 26 which operates the spindles and to shaft 230 which is the slow speed shaft for operating tube 54.

When sprocket 218 is clutched to shaft 212 so as to drive sprocket 232, the sprocket 226 and the parts driven thereby are operated at high speed because clutch ring 240 may rotate freely on hub 238. When sprocket 218 is released from shaft 212, then sprocket 232 is driven from shaft 230 through the clutch mechanism at a slow speed.

By engaging and disengaging clutch mechanism 216 therefore the sprocket 232 and by it, sprocket 226 and finally tube 54 is accordingly operated at a high or low speed. By rocking lever 286 in one direction or the other clutch teeth 236 are engaged or disengaged so that the tube 54 and driving shaft 212 are connected and disconnected.

Tools of various forms may be carried by the turret. For instance, taps, dies, drills or the like may be used so that as the turret advances towards the work in the spindles, the desired operations may be performed on the work. One form of tool is indicated at T.

It may be desirable to provide means to rotate the tools carried by the turret. This may be accomplished by providing gears 322 on the ends of the tool holders, which may rotate on the turret. These may mesh with a gear 324, fixed to a gear 326 rotatable on the turret and which is rotatable by a gear 328 of a shaft 330 extending between the turret slide 12 and headstock. The shaft 330 may be slidable in a box 332 which contains suitable gear mechanism for rotating the shaft which is driven from some rotatable element of the head stock assembly.

A brief description of the operation of the machine will now be given. A bar of material is carried by each of the spindles 8 and clutched by the collets for rotation. The tool slide moves back and forth to bring its tools into engagement with the ends of the bars. Preferably the completed work at the end of the bar of one spindle is being cut off while the end of the other bar is being formed. The collets operate alternately to release their respective bars and the feed tube of the releasing collet feeds a bar forwardly.

The turret is indexed so as to present tools alternately to the spindles and moves towards and away from the spindles after each indexing movement. The stop arm is indexed to a position in front of the spindle of which the bar is fed forwardly so as to arrest the feeding movement thereof.

The driving shaft clutch 216 is arranged to be operated so that the tube 54 is operated at high speed while the turret is being indexed and operated at low speed, while the turret tools are acting on the work.

Altogether the parts are arranged and adapted so that various objects may be formed at the end of the bars. The timing of the various units in respect to the relative operation thereof may be varied within wide limits to accomplish results.

The machine is not only automatic in its operation, but is so constructed and arranged that it operates with precision and at high speed so that the utmost efficiency results.

Various changes may be made in the form of the invention without departing from the spirit and scope thereof and therefore I prefer to be limited, if at all, by the appended claims rather than by the foregoing description.

What I claim is:

1. A machine tool of the class described comprising in combination, a plurality of spindles rotatable in a head stock, a spindle shaft and driving connections between said shaft and spindles, a tool slide reciprocable transversely of said spindles, a pair of engageable members in said slide, a driving tube around said shaft carrying a cam for alternately engaging said engageable members for moving said slide back and forth.

2. A machine tool of the class described comprising in combination, a plurality of spindles rotatable in a head stock, a spindle shaft and driving connections between said shaft and spindles, a tool slide reciprocable transversely of said spindles, a pair of engageable members in said slide, a driving tube around said shaft carrying a cam for alternately engaging said engageable members for moving said slide back and forth, means associated with said spindles for gripping and feeding work and means associated with said tube for operating said means.

3. A machine tool of the class described comprising in combination, a turret and a disc fixed together for rotation, the latter being provided with a radial slot, an arm having a part for working in said slot which is pivoted for swinging movements, means for urging said arm in one direction, a pair of spaced rolls on said arm and a rotatable cam having separated points for successively engaging said rolls to move said arm intermittentaly between one position and another.

4. A machine tool of the class described comprising in combination, a pair of rotatable spindles, a rotatable tube, a stop carried thereby, a turret slidable and non-rotatable on said tube, a disc movable with said turret having a radial slot, an arm pivoted below said tube for swinging movements, a pair of spaced rolls on said arm and a roll carried thereby for working in said slot, a rotatable cam having spaced points for successively engaging said rolls and moving said disc step by step so as to intermittantly rotate said turret and to locate said stop into and out of position in front of one of said spindles and means for urging said arm in one direction.

5. A machine tool of the class described comprising in combination, a pair of rotatable spindles, a rotatable tube, a stop fixed thereto, a turret slidable and non-rotatable on said tube, a disc movable with said turret having a radial slot, an arm pivoted for swinging movements between a right and left position provided with a roll for working in said slot, a pair of spaced rolls in said arm, a rotatable cam having points for successively engaging said rolls for moving said arm from a right to an intermediate position and then to a left position, the said points being spaced so the arm dwells in said intermediate position and the said stop being arranged so that it lies in front of a spindle while the arm dwells and means for urging the arm towards its right position.

6. A machine tool of the class described comprising in combination, a pair of rotatable spindles, a rotatable tube, a stop fixed thereto, a turret slidable and nonrotatable on said tube, a disc movable with said turret having a radial slot, an arm pivoted for swinging movements between a right and left position provided with a roll for working in said slot, a pair of spaced roll in said arm, a rotatable cam having points for successively engaging said rolls for moving said arm from a right to an intermediate position and then to a left position, the said points being spaced so the arm dwells in said intermediate position and the said stop being arranged so that it lies in front of a spindle while the arm dwells and means for urging the arm towards its right position and a slide movable towards and away from said spindles in which the turret is rotatable.

7. A machine tool of the class described comprising in combination, a pair of rotatable spindles, a rotatable tube, a stop fixed thereto, a turret slidable and nonrotatable on said tube, a disc movable with said turret having a radial slot, an arm pivoted for swinging movements between and right and left position provided with a roll for working in said slot, a pair of spaced rolls in said arm, a rotatable cam having points for successively engaging said rolls for moving said arm from a right to an intermediate position and then to a left position, the said points being spaced so the arm dwells in said intermediate position and the said stop being arranged so that it lies in front of a spindle while the arm dwells and means for urging the arm towards its right position, a slide movable towards and away from said spindles in which the turret is rotatable and means for locking said turret to said slide while the slide moves forward and back.

8. A machine tool of the class described comprising in combination, a pair of rotatable spindles, a slide movable towards and away therefrom, a turret rotatable in said slide which is slidable but non-rotatable on a tube, a stop on said tube, a disc movable with said turret having a radial slot in a face thereof, an arm pivoted for swinging movements having a roll for working in said slot, a pair of spaced rolls on said arm, a rotatable cam having points for engaging said rolls, all adapted and arranged whereby the slide may carry the turret to and from said spindles between rotative movements thereof.

9. A machine tool of the class described comprising in combination, a rotatable tube having a turret slidable and non-rotatable thereon, a second rotatable tube, engageable means for driving the former tube from the latter, a stationary gear, a gear fixed to said second tube, a member rotatable on said gear having pinions meshing with both of said gears and means for rotating said member whereby the last named gear is rotated by said stationary gear for rotating said tube.

10. A machine tool of the class described comprising in combination, a pair of rotatable spindles, a rotatable tube, a stop fixed thereto, a turret slidable and non-rotatable on said tube, a disc movable with said turret having a radial slot, an arm pivoted for swinging movements between a right and left position provided with a roll for working in said slot, a pair of spaced rolls in said arm, a rotatable cam having points for successively engaging said rolls for moving said arm from a right to an intermediate position and then to a left position, the said points being spaced so the arm dwells in said intermediate position and the said stop being arranged so that it lies in front of a spindle while the arm dwells and means for urging the arm towards its right position, a slide movable towards and away from said spindles in which the turret is rotatable and means for locking said turret to said slide while the slide moves forward and back, said means including shiftable devices and a main drive whereby the member may be driven at different speeds.

11. A machine tool of the class described, comprising in combination, a support, a turret rotatable on a certain axis in said support which is reciprocable back and forth between rear and forward positions, a member associated with said turret having a radial slot, an arm oscillatable back and forth having a roll receivable in an end of said slot when the turret is in a rear position, mechanism for oscillating said arm in one direction to move said roll along said slot to rotate said disc, means for moving said turret forwardly whereby the roll is released by said slot and means to oscillate said arm in an opposite direction.

12. A machine tool of the class described, comprising in combination, a support, a turret rotatable on a certain axis in said support which is reciprocable back and forth between rear and forward positions, a member associated with said turret having a radial slot, an arm oscillatable back and forth having a roll receivable in an end of said slot when the turret is in a rear position, mechanism for oscillating said arm in one direction to move said roll along said slot to rotate said disc, means for moving said turret forwardly whereby the roll is released by said slot and means to oscillate said arm in an opposite direction and a stop arm connected to and movable by rotative movements of said turret.

13. A machine tool of the class described, comprising in combination, a support, a turret rotatable in a support reciprocable between forward and rear positions, a member associated therewith having a radial slot, an arm pivoted for oscillating movements on said support, a roll on said arm receivable in an end of said slot, a pair of rolls on said arm, a rotatable cam having parts for engaging said rolls and means for reciprocating said turret.

14. A machine tool of the class described, comprising in combination, a support, a turret rotatable in a support reciprocable between forward and rear positions, a member associated therewith having a radial slot, an arm mounted for oscillations having a roll receivable in said slot, a rotatable cam having spaced points for engaging spaced parts of said arm whereby the arm is oscillated intermittently from one position to another and means to return the arm to said one position when the roll is released by said slot and means for reciprocating said turret.

15. A machine tool of the class described, comprising in combination, a support, a turret rotatable in a support reciprocable between forward and rear positions, a member associated therewith having a radial slot, an arm mounted for oscillations having a roll receivable in said slot, a rotatable cam having spaced points for engaging spaced parts of said arm whereby the arm is oscillated intermittently from one position to another and means to return the arm to said one position when the roll is released by said slot and means for reciprocating said turret and means for locking said turret against rotation during reciprocation thereof and to release the same when in its rear position.

16. A machine tool of the class described, comprising in combination, a support, a turret rotatable in a support reciprocable between forward and rear positions, a disc associated therewith having a radial slot, an arm pivoted for oscillatory movements having a roll receivable in said slot when in one position with the turret in its rear position, spaced rolls on said arms, a rotatable cam having spaced points for successively engaging said rolls whereby the arm is oscillated from said one position to an intermediate position and then to another position to move said first-named roll along the slot to rotate the disc and turret from rear to forward position and return whereby the roll of the arm is released and means to return said arm to said one position.

17. A machine tool of the class described, comprising in combination, a support, a turret rotatable in a support reciprocable between forward and rear positions, a disc associated therewith having a radial slot, an arm pivoted for oscillatory movements having a roll receivable in said slot when in one position with the turret in its rear position, spaced rolls on said arm, a rotatable cam having spaced points for successively engaging said rolls whereby the arm is oscillated from said one position to an intermediate position and then to rotate the disc and turret from rear to forward position and return whereby the roll of the arm is released and means to return said arm to said one position and means for locking said turret against rotation during its reciprocating movements and means for releasing the same when the turret is in its rear position.

18. A machine tool of the class described, comprising in combination, a bed, a head and a gear box at opposite ends thereof, spindles rotatable in said head, a shaft extending between said head and box, driving connections between said shaft and spindles, a tube surrounding said shaft rotatable relative thereto, a turret slidable on said tube between said head and box, a second tube between said first-named tube and shaft, engageable connections between said tubes whereby it is rotated by the other and means for rotating said shaft and one of said tubes.

19. A machine tool of the class described, comprising in combination, a bed and a head and a gear box at opposite ends thereof, a rotatable shaft extending between said head and box, rotatable spindles in said head, driving connections between said shaft and spindles, a tool reciprocable on said bed, a rotatable cam for engaging parts on said slide for reciprotating the same, an inner tube on said shaft and connections between said tube and cam, an outer tube rotatable on said inner tube, a turret slidable on said bed between said head and box having a rotatable part reciprocable but non-rotatable on said outer-tube, driving connections between said tubes and means for driving one of said tubes and shaft.

20. A machine of the class described comprising in combination a support, a head and gear box, a turret support reciprocable on said support between said head and box, a turret rotatable in said turret support, a shaft and tube extending between said head and box arranged for relative rotation on a common axis and extending through said turret, a main drive shaft in said box, means connecting said drive shaft and first-named shaft for driving the latter continuously from the former, driving connections between said main drive shaft and said tube for driving the tube at different speeds from said main shaft and means associated with said tube and turret for rotating said turret from said tube.

21. A machine of the class described comprising in combination a support, a head and gear box, a turret support reciprocable on said support between said head and box, a turret rotatable in said turret support, a shaft and tube extending between said head and box arranged for relative rotation on a common axis and extending through said turret, a main drive shaft in said box, means connecting said drive shaft and first-named shaft for driving the latter continuously from the former, driving connections between said main drive shaft and said tube for driving the tube at different speeds from said main shaft and means associated with said tube and turret for rotating said turret from said tube, and means for reciprocating the turret slide operable by said tube.

22. A machine of the class described comprising in combination, a support having a head and a gear box associated therewith, a turret support reciprocable on said support having a turret rotatable therein, a spindle shaft and a tube extending between said head and box relatively rotatable on a common axis and extending through said turret, means associated with said turret and tube whereby the former is rotated by the latter, a main shaft in said gear box, connections between said main shaft and said spindle shaft for continuously driving the latter from the former, connections between said spindle shaft and tube for driving the latter from the former at a certain speed and connections between said drive shaft and tube for driving said tube at a different speed.

23. A machine of the class described comprising in combination a support, a head and gear box associated therewith, a turret support reciprocable on said support having a turret rotatable therein, a spindle shaft and a tube extending between said head and box relatively rotatable on a common axis and extending through said turret, means associated with said turret and tube whereby the former is rotated by the latter, a main shaft, driving connections between said shaft and said spindle shaft, axially aligned separate rotatable parts, driving connections between one of separate parts and said tube, driving connections between said last-named connection and said drive-shaft, driving connections between said spindle shaft and the other of said separate parts, clutch mechanisms associated with said separate parts operable to clutch them together acordingly as one is rotated at a slower speed than the other.

24. A machine of the class described comprising in combination, a support having a head and a gear box at opposite ends thereof, a spindle rotatable in said head, a turret support reciprocable on said support between said head and box, a spindle shaft and a tube independently rotatable on a common axis and extending between said head and box, a turret rotatable in said turret support on the axis of rotation of said shaft and tube, means associated with said tube and turret whereby the latter is rotated by the former, a main shaft rotatable in said box, driving connections between said main and spindle shaft, axially aligned separate rotatable parts driving connections between one of said parts and said tube, a releasable clutch on said main shaft, driving connections between said clutch and said one of the separate parts whereby the tube may be driven from the main shaft at a certain speed, driving connections between said spindle shaft and the other one of the separate parts whereby said part is driven from the spindle shaft at a relatively slower speed and a clutch mechanism associated with said separate parts operable to clutch the same together when the clutch on the main shaft is released whereby the tube is driven from the spindle shaft at a less speed than said certain speed.

25. A machine of the class described comprising in combination, a support having a head and a gear box at opposite ends thereof, a spindle rotatable in said head, a turret support reciprocable on said support between said head and box, a spindle shaft and a tube independently rotatable on a common axis and extending between said head and box, a turret rotatable in said turret support on the axis of rotation of said shaft and tube, means associated with said tube and turret whereby the latter is rotated by the former, a main shaft rotatable in said box, driving connections between said main and spindle shafts, axially aligned separate rotatable parts, driving connections between one of said parts and said tube, a releasable clutch on said main shaft, driving connections between said clutch and said one of the separate parts whereby the tube may be driven from the main shaft at a certain speed, driving connections between said spindle shaft and the other one of the separate parts whereby said shaft is driven from the spindle shaft at a relatively slower speed, a clutch mechanism associated with said separate parts operable to clutch the same together when the clutch on the main shaft is released whereby the tube is driven from the spindle shaft at a less speed than said certain speed and driving connections between said tube and said turret support whereby the latter is reciprocated accordingly as the former rotates.

In testimony whereof I affix my signature.

ELMER E. KELLEY.